No. 882,649. PATENTED MAR. 24, 1908.
G. W. NOBLE.
CABLE LAYING MACHINE.
APPLICATION FILED JUNE 15, 1907.
2 SHEETS—SHEET 1.
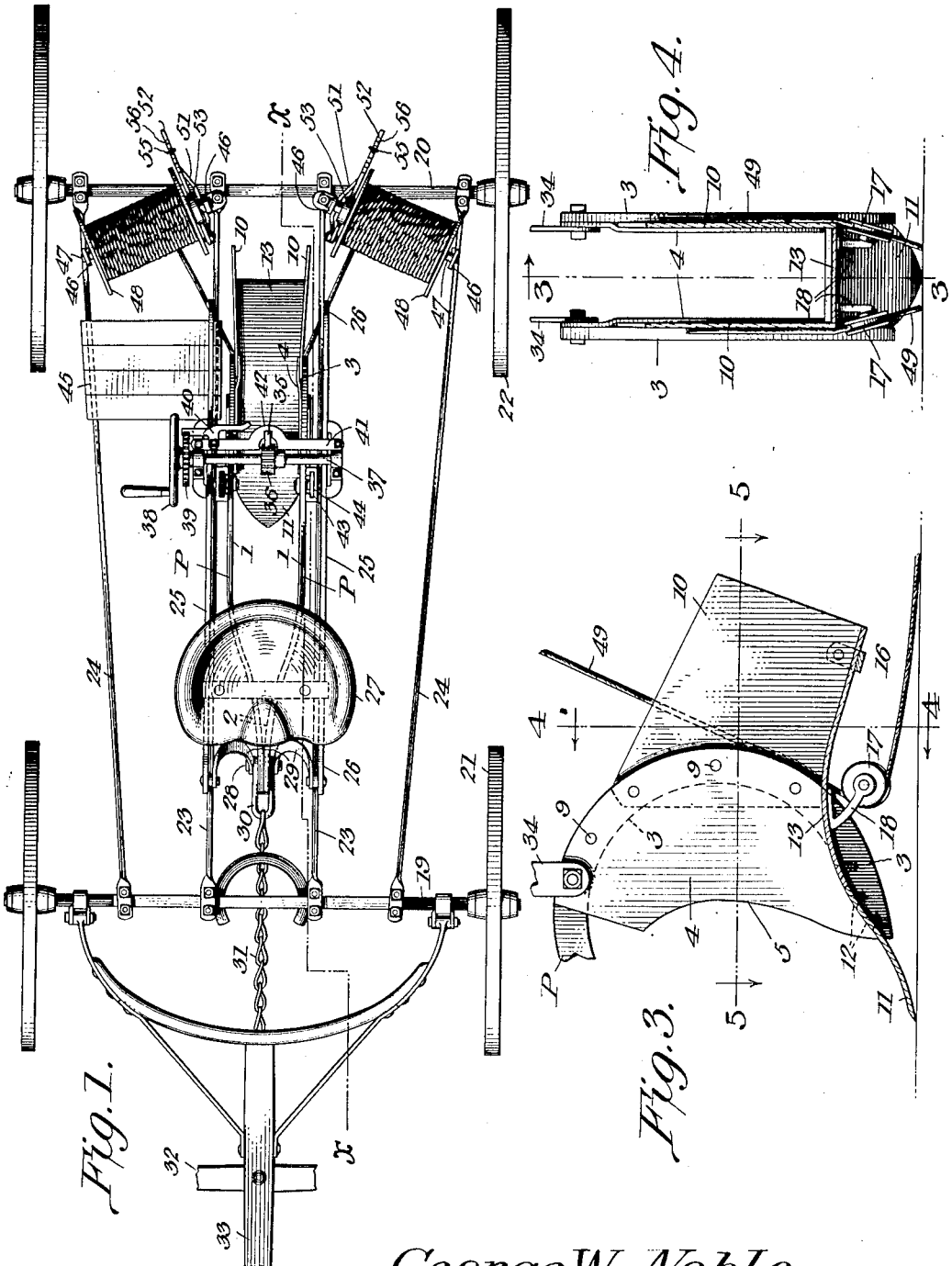
George W. Noble, Inventor,
Witnesses
by C. A. Snow & Co.,
Attorneys

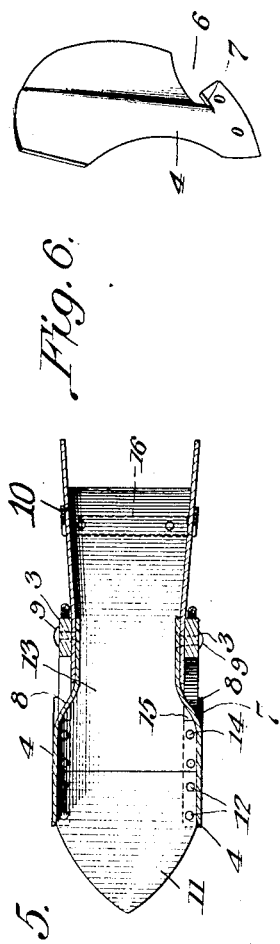
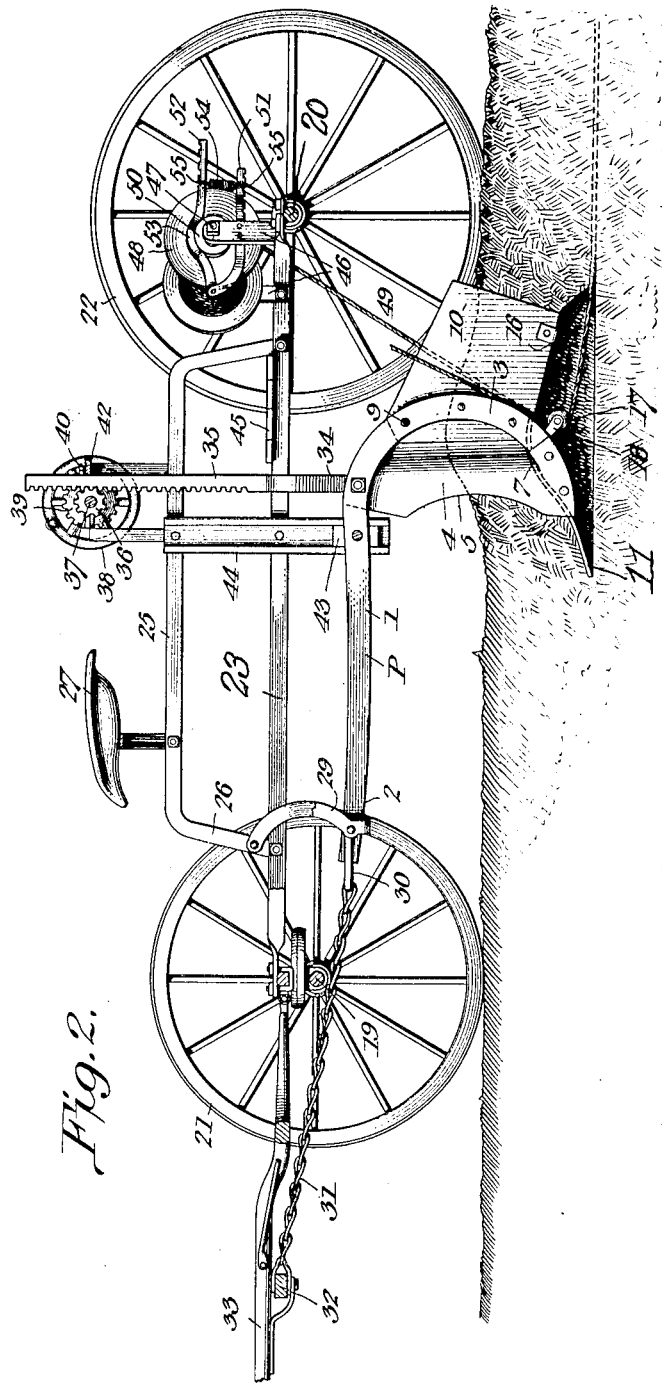

UNITED STATES PATENT OFFICE.

GEORGE W. NOBLE, OF COLLBRAN, COLORADO.

CABLE-LAYING MACHINE.

No. 882,649.   Specification of Letters Patent.   Patented March 24, 1908.

Application filed June 15, 1907. Serial No. 379,236.

*To all whom it may concern:*

Be it known that I, GEORGE W. NOBLE, a citizen of the United States, residing at Collbran, in the county of Mesa and State of Colorado, have invented a new and useful Cable-Laying Machine, of which the following is a specification.

This invention relates to machines for laying cables, such as telegraph or telephone cables, and the like.

The object of the invention is to lay an underground cable at a moderate distance below the surface of the soil, so as not to interfere with ordinary cultivation of the latter, by forming a trench and laying a cable or cables in the bottom of said trench without removing any material from said trench; the operation being effected by simply loosening a slice of material and pushing the same upwardly to make room for the cable or cables, and presently permitting said slice of material to settle back into the trench, completely covering the cable or cables and completing the operation.

Other objects of the invention are to simplify and improve the construction and operation of the machine which is used for carrying the invention into effect.

With these and other ends in view, which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that the right is reserved to any changes, alterations and modifications to which recourse may be had within the scope of the invention and without departing from the spirit or sacrificing the efficiency of the same.

In said drawings, Figure 1 is a top plan view of a cable laying machine constructed in accordance with the principles of the invention. Fig. 2 is a longitudinal sectional elevation of the same on the line of $x$—$x$ of Fig. 1 except that the guide bar for the rack for elevating the dirt loosening and lifting mechanism is shown in section through the central curved portion thereof. Fig. 3 is a longitudinal sectional view, taken on the plane indicated by the line 3—3 in Fig. 4, of the trench forming and cable laying mechanism. Fig. 4 is a vertical transverse sectional view taken on the plane indicated by the line 4—4 in Fig. 3. Fig. 5 is a horizontal sectional view taken on the plane indicated by the line 5—5 in Fig. 3. Fig. 6 is a perspective detail view of one of the cheeks or cutters of the trench forming mechanism.

Corresponding parts in the several figures are indicated throughout by similar characters of reference.

The improved device includes a dirt loosening and lifting mechanism comprising vertical cutters or cheeks for loosening, and means for slightly elevating a slice of soil, the same being temporarily elevated for a short distance during the progress of the machine and then permitted to settle back into the trench, from which it was temporarily detached, so as to cover a cable or cables introduced beneath the slice while the latter was elevated above the bottom of the trench. Said mechanism includes a pair of plow beams P—P having parallel portions 1, 1 and forwardly converging front ends 2, 2, the parallel portions of said beams being curved downwardly, still preserving their parallelism, and forming standards 3, 3.

Upon the standards are mounted cheeks or cutters 4, 4, the front edges of which are beveled and sharpened; said front edges being preferably curved, as shown at 5 in Fig. 3 of the drawings. The said cheeks or cutters are provided at their rear corners with notches 6 and with forwardly extending slits 7; the lower edges of the cutters are bolted exteriorly upon the lower ends or points of the beams, and said cutters or cheek plates are then bent inwardly across or astride the beams, as will be best seen at 8 in Fig. 5 of the drawings; the presence of the slits 7 making it possible to thus bend the cheek plates and to secure the rear edges of said plates, as by means of bolts 9 upon the inner sides of the standards. Rearwardly extending wings 10, constituting extensions of the cheeks or cutters, have their front edges interposed between the inner sides of the standards and the rear ends of the cheek plates, and are secured in position by the same bolts 9 which are used for securing the cheek plates or cutters.

The forward extremities or points of the standards 3 support an earth engaging blade 11 which is preferably pointed somewhat in the manner of an ordinary bull tongue plow, as will be seen in Fig. 5. This blade rests upon the standards between the lower forward extremities of the cutters or cheeks, and it is firmly secured in position as by means of bolts or screws 12. The blade 11 presents an inclined plane, a rearward continuation or extension of which is formed by a curved apron 13, the front portions of the edges of which are supported upon the standards in rear of the blade 11, and secured by means of screws 14, as will be clearly seen in Fig. 5; the sides of said apron are provided with notches or recesses 15 for the accommodation of the vertical portions of the standards 3. It will be observed that the wings 10 diverge rearwardly and that their rear edges are spaced by a distance at least equal to the distance between the outer sides of the standards 3; in other words, the standards are inset between the front edges of the cutters 4 and the rear edges of the wings 10, so that said standards will present no obstruction to the progress of the machine when the latter is in operation.

The apron 13, a portion of which forms an upward extension of the inclined plane presented by the blade 11, is downwardly inclined at its rear end and is fitted between the divergent lower edges of the wings 10 with which said apron may be connected by any suitable means, such as a cross bar 16. Beneath the elevated portion of said apron is supported cable guiding means, such as one or more grooved pulleys 17, set at a suitable slant or inclination and mounted for rotation upon brackets 18; cable guiding means of any other nature or construction may be substituted, if desired, and may be considered as within the scope of the invention.

The improved trench or tunnel cutter, as it may be appropriately named, is carried in a frame which, in the drawing, has been illustrated as being composed of a pair of axles 19, 20 having wheels 21, 22. The front and rear axles 19 and 20 have been shown as connected by means of a pair of parallel frame bars 23 and by a pair of rearwardly diverging frame bars 24, the latter being suitably spaced from the outer sides of the bars 23. Supported above the frame bars 23 are frame bars 25 having downturned ends 26 which are bolted to or otherwise suitably connected with the bars 23; said upper frame bars 25 serve to support a suitably located driver's seat 27. The front ends of the plow beams P are connected by means of a clevis bolt 28 which is connected by means of links 29 with fixed points of the frame; for instance, with the downturned front ends 26 of the upper frame bars 25, as will be clearly seen in Fig. 2 of the drawings. The clevis 30 at the front end of the beams is connected by means of a chain 31 with the draft attachment, which may consist of an equalizer 32 connected with a tongue 33 which is suitably connected with the front axle 19. Draft will thus be applied directly to the front ends of the beams which, however, are connected so as to form a single structure, and being applied in this manner the draft will be found most effective.

Connected with the plow beams P near their rear ends is a yoke 34 having an upwardly extending rack bar 35 which engages a pinion 36 upon the shaft 37, which is supported in suitable bearings above the frame bars 25, said shaft being also provided with a hand wheel 38 whereby it may be rotated. Said shaft carries an additional pinion or spur wheel 39 adapted for engagement with a spring pressed pawl 40 which is supported upon a cross bar 41; the latter being provided with an offset or arched portion 42 serving to accommodate the rack bar 35 and to hold the latter in engagement with the pinion 36. By means of the pawl 40 the shaft 37 may be held against rotation, and the rack bar, together with the plow beams and the earth displacing element connected therewith, may thus be adjusted to and securely retained at any desired elevation. The beams are additionally guided by means of blocks or slides 43 connected pivotally with said beams and guided in grooved guide bars 44 which are secured upon the frame members 23 and 25, as will be clearly seen in Fig. 2 of the drawings. A platform, 45, serving as a stand for the operator, is supported upon the frame of the machine near the rear end of the latter.

The frame bars or members 23 and 24 are provided near their rear ends with uprights 46 affording bearings for shafts 47 carrying reels 48 upon which the cables 49 are wound. Each of said reels is provided with a friction disk 50 engaged by a friction device comprising an arm 51 securely connected with one of the uprights 46 and having pivotally connected therewith another arm 52 provided with a curved disk engaging portion 53 the tension of which may be regulated by means of a coiled spring 54 having hooped ends 55 adjustable in notches 56 formed in the arms 51 and 52, which latter may thus be drawn in the direction of each other with any desired degree of tension, causing the curved portion 53 of the arm 52 to engage the friction disk, and thus regulating the rotation of the reel with which said disk is connected.

The operation and advantages of this invention will be very readily understood from the foregoing description, taken in connection with the drawings hereto annexed. One or more cables may be laid by providing the requisite number of reels and cable guides, the cables coming from the reels being threaded over said guides and made fast, as by means of stakes driven into the ground.

It is obvious that at the starting point a small excavation may be made, if desired, or the cables may be threaded over the guides and made fast at the top of the ground, after which the earth displacing member may be gradually lowered during the progress of the machine until the desired depth is attained. It is intended to make the machine of such dimensions that the cable or cables may be laid at a sufficient depth, say from twenty to twenty-four inches, so that they will not be interfered with by subsequent cultivation of the soil; the machines, however, may be made of different sizes, and the cables may be laid at various depths, without departing from the scope of the invention. As the machine progresses, the cutting members will cut into the soil, thus loosening and slightly displacing in an upward direction a slice of soil of the desired dimensions; at the same time, the cable or cables will be fed behind the beams or carrying members 3, and over the pulleys or guide members 17, being thus laid in the bottom of the tunnel or trench formed by the displacement of the soil and almost immediately covered by the return of the slice into the place from which it was temporarily displaced, the strain or tension upon the cables being regulated by the tension means operating upon the reels in the manner hereinbefore described.

This improved machine is simple in construction, and it has by practical tests been proven to be thoroughly effective for the purposes for which it is intended.

Having thus described the invention, what is claimed is:—

1. A machine for laying cables including means for forming a tunnel by temporarily elevating without laterally displacing the soil.

2. A machine for laying underground cables including tunneling means for temporarily displacing the soil in a vertical direction only for the reception of the cable.

3. In a machine of the class described, means for detaching and for temporarily slightly elevating without laterally displacing a slice of soil and for permitting said slice to settle back into the furrow from which it was taken, without removal from said furrow.

4. In a machine of the class described, means for temporarily forcing in an upward direction only a detached slice of soil, means for feeding a cable beneath the raised portion of the slice, and means for guiding the slice into the trench or furrow from which it was lifted.

5. In a machine of the class described, means for temporarily forcing in an upward direction only a detached slice of soil and for feeding a cable between the sides of said slice and the walls of the trench from which it was taken.

6. A pair of parallel standards having cutters connected therewith, said cutters having inset portions to receive said standards.

7. A pair of standards having inset cutters and wings connected therewith.

8. A pair of standards, cutters having inset portions connected with said standards, and a blade supported upon the latter.

9. A pair of standards, cutters having inset portions straddling the standards, and an earth engaging blade supported upon said standards between the cutters.

10. A pair of standards, cutters having inset portions straddling the standards, and rearwardly divergent wings supported between and connected with the cutters and the standards.

11. Cutters and rearwardly divergent wings having inset overlapping portions, standards connected exteriorly with said inset portions, and an earth engaging blade supported upon the points of the standards.

12. Cutters and rearwardly divergent wings having inset overlapping portions, standards connected exteriorly with said inset portions, an earth engaging blade supported upon the points of the standards, and an apron forming a rearward extension of said blade and having a downwardly inclined rear portion.

13. A soil engaging device of approximately U-shaped cross section having inset side members, and standards or carrying members connected exteriorly therewith.

14. A soil engaging device of approximately U-shaped cross section having inset side members, and bottom members inclined downwardly in a forward and rearward direction, standards or carrying members connected with the inset side members; and cable guides supported under the intermediate elevated portion of the bottom.

15. An earth displacing element, cable guiding means connected therewith, a cable supply reel, and means for frictionally engaging the latter to regulate the tension upon the cable.

16. An earth displacing element, cable guiding means connected therewith, cable feeding means, and means for regulating the tension upon the cable.

17. An earth displacing element having inset side members, standards or carriers connected with the inset portions of the side members, cable guiding means supported beneath the earth engaging element, and means for feeding a cable behind the standards or carriers and over the guiding means.

18. An earth displacing element forming a cable carrier, forwardly convergent beams supporting said element, means for effecting vertical adjustment of the beams, and guides for the latter.

19. An earth displacing element forming a cable carrier, forwardly convergent beams supporting said element, means for applying draft to the forward ends of said beams, means for effecting vertical adjustment of the rear ends of the latter, and guides for said beams.

20. An earth displacing element, beams supporting said element, a carrying frame, links connecting said beams with said frame, means for applying draft direct to the forward ends of said beams, and means for effecting vertical adjustment of the rear ends of the latter.

In testimony that I claim the foregoing as my own, I have hereto affixed my signature in the presence of two witnesses.

GEORGE W. NOBLE.

Witnesses:
 JOHN W. LOWELL, Jr.,
 ALBERT McRAE.